(12) United States Patent
Ide

(10) Patent No.: US 6,817,781 B2
(45) Date of Patent: Nov. 16, 2004

(54) OPTICAL CONNECTOR

(75) Inventor: Takehisa Ide, Ichihara (JP)

(73) Assignee: Fujikura Ltd., Tokyo (JP)

( * ) Notice: Subject to any disclaimer, the term of this patent is extended or adjusted under 35 U.S.C. 154(b) by 213 days.

(21) Appl. No.: 10/186,968

(22) Filed: Jul. 2, 2002

(65) Prior Publication Data
US 2003/0007748 A1 Jan. 9, 2003

(30) Foreign Application Priority Data
Jul. 6, 2001 (JP) ........................................ 2001-206897

(51) Int. Cl.[7] .............................................. G02B 6/42
(52) U.S. Cl. .............................. 385/88; 385/76; 385/77; 385/78; 385/92; 385/93; 385/94; 385/139
(58) Field of Search ............................. 385/88, 76, 77, 385/78, 92, 93, 94, 139

(56) References Cited

U.S. PATENT DOCUMENTS 4,539,476 A * 9/1985 Donuma et al. ....... 250/227.24
5,936,263 A    8/1999 Hashizume

FOREIGN PATENT DOCUMENTS

| | | |
|---|---|---|
| DE | 195 15 795 | 11/1995 |
| DE | 197 11 138 | 9/1998 |
| EP | 1 136 859 | 9/2001 |
| JP | 5-118831 | 5/1993 |
| JP | 6-33443 | 8/1994 |
| JP | 6-342114 | 12/1994 |
| JP | 11-23904 | 1/1999 |
| JP | 2001-51151 | 2/2001 |
| JP | 2001-51152 | 2/2001 |
| JP | 2001-51153 | 2/2001 |
| JP | 2001-51155 | 2/2001 |
| JP | 2001-51156 | 2/2001 |
| JP | 2001-51163 | 2/2001 |
| JP | 2001-66469 | 3/2001 |
| JP | 2001-74987 | 3/2001 |

* cited by examiner

Primary Examiner—Dean A. Reichard
Assistant Examiner—Jinhee Lee
(74) Attorney, Agent, or Firm—Oblon, Spivak, McClelland, Maier & Neustadt, P.C.

(57) ABSTRACT

An optical connector for connecting a plug unit for holding the end face of an optical fiber with an inward retraction from the leading end portion and a receptacle unit having packaged therein a light receiving/emitting element to transfer an optical signal with the optical fiber, to each other through a clearance between the end face of the optical fiber and the light receiving/emitting element. The optical connector includes a lens disposed in at least one of the position which is retracted inward from the leading end portion of the plug unit and the position which is retracted inward from the end face of the receptacle unit on the plug unit side, for condensing the optical signal, as emitted from one of the optical fiber and the light receiving/emitting element, to the other.

6 Claims, 4 Drawing Sheets

OPTICAL CONNECTOR

BACKGROUND OF THE INVENTION

1. Field of the Invention

The present invention relates to an optical connector to be used in a data communication system such as an optical LAN system for an automobile.

2. Related Art

Optical communications play an important role as communication means for supporting the sophisticated information society. This communication means is exemplified by a local area network such as the LAN and is recently incorporated into a mover such as an automobile. This optical communication line is composed mainly of optical fibers and light receiving/emitting element, which have to be connected for constructing the line network. As the method for connecting those elements, there has been known the direct connecting method for fusing the optical fibers or the method using the optical connectors.

When the optical communication network is to be constructed in a stationary structure such as a building, the works are done with dedicated tools or connectors, and by special engineers so that a firm and reliable communication network of little loss is constructed. Moreover, the structure is not encountered by any special problem even if it is more or less complicated.

Under the situation in which the assembling environment is not necessarily excellent as when the optical communication network is constructed in the automobile, however, the components have to be able to be connected simply but reliably unlike the case in which the optical communication network is constructed in the stationary structure. Moreover, it is necessary that the connectors for the components are inexpensive and small-sized.

One example of the connectors of this kind is disclosed in Japanese Utility Model Publication No. 6-33443. In this disclosure, the leading end portion, as called the "ferrule", of an optical fiber is held in a plug unit, and this plug unit is fitted in a receptacle unit. Moreover, the connector is provided in the fitted state with an optical element which is positioned on the leading end side of the optical fiber for transferring an optical signal with the optical fiber.

The optical fiber is cut at its leading end portion so that its leading end is exposed to the outside. If the leading end portion of the fiber is either protruded from or positioned flush with the outer surface of the plug unit, however, the leading end of the fiber may be contaminated or damaged, when handled or assembled, so that it cannot transfer the optical signal or increases the transmission loss of the signal.

In the connector disclosed, therefore, the leading end portion of the optical fiber in the plug unit is retracted from the leading end face of a cylindrical unit holding it so that the leading end portion is enveloped in the cylinder unit.

With the aforementioned construction of the prior art, therefore, when the plug unit is fitted in the receptacle unit (or the receiving unit), the leading end portion of the optical fiber and the optical element on the side of the receiving unit are largely spaced. In the disclosed connector of the prior art, therefore, an optical conduction unit of a material or construction similar to that of the optical fiber is interposed between the leading end portion of the optical fiber and the light receiving/emitting element.

In the optical connector of the aforementioned structure, however, the optical signal is transmitted through the boundary between the optical fiber and the optical conduction member and through the boundary between the optical conduction member and the light receiving/emitting element. Therefore, the optical signal may be attenuated by the reflections or scatters at those boundaries. In order to prevent or suppress these disadvantages, the end faces of the optical fiber and the optical conductor member have to be precisely polished thereby to invite another disadvantages that the number of steps of manufacturing the optical connector is increased, and that the cost for manufacturing the optical connector is raised.

For keeping the transmission efficiency of the optical signal satisfactory, on the other hand, it is necessary to adjust the optical axes highly precisely. In the aforementioned structure of the prior art, however, it is obliged to make adjustments to align the optical axes of the three components, i.e., the optical fiber, the optical conduction member and the light receiving/emitting element. Therefore, there arise other disadvantages that the steps of assembling the optical connector become complex and difficult, and that the optical axis adjusting works become factors to raise the manufacture cost.

In the construction of the prior art, moreover, the media for transmitting the optical signal are increased to raise another disadvantage that the transmission loss of the optical signal grows higher. Moreover, the enlarged number of parts raises the cost higher.

SUMMARY OF THE INVENTION

An object of the invention is to provide an optical connector having a high optical signal transmission efficienty and an excellent manufacturability, and a method for manufacturing the optical connector.

The optical connector of the invention is provided with: a plug unit holding an optical fiber; and a receptacle unit holding a light receiving/emitting element fitting the plug unit so that it is confronted by the leading end portion of the optical fiber. The light receiving/emitting element is buried in a transparent resin filled therearound, and the leading end portion of the optical fiber is held at a spacing from the outer face of the transparent resin. On the surface side of the transparent resin confronted by the leading end portion of the optical fiber, moreover, there is arranged a lens for condensing an optical signal on the light receiving/emitting element or the optical fiber.

Even if a space is left on the leading end side of the optical fiber, therefore, the optical signal can be reliably transmitted between the optical fiber and the light receiving/emitting element. In other words, no filling member for transmitting the optical signal is required on the leading end side of the optical fiber.

In the invention, moreover, the outer face of the transparent resin filled around the light receiving/emitting element is partially molded to form the lens. With this construction, the transparent resin fixing the light receiving/emitting element can also act as the lens so that the number of components can be reduced to lower the cost.

In the optical connector of the invention, moreover, the leading end portion of the optical fiber can be held with a retraction from the leading end of the plug unit, and the lens and the light receiving/emitting element can be held with an inward retraction from the leading end of the receptacle unit. With this construction, the optical fiber, the lens and so on can be prevented from being damaged, when they are handled before the plug unit is fitted in the receptacle unit.

In the invention, moreover, a prepared lens can be mounted in the receptacle unit, and a transparent resin can be filled between the lens and the light receiving/emitting element. According to this method, the lens need not be worked in the receptacle unit so that the productivity is improved.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
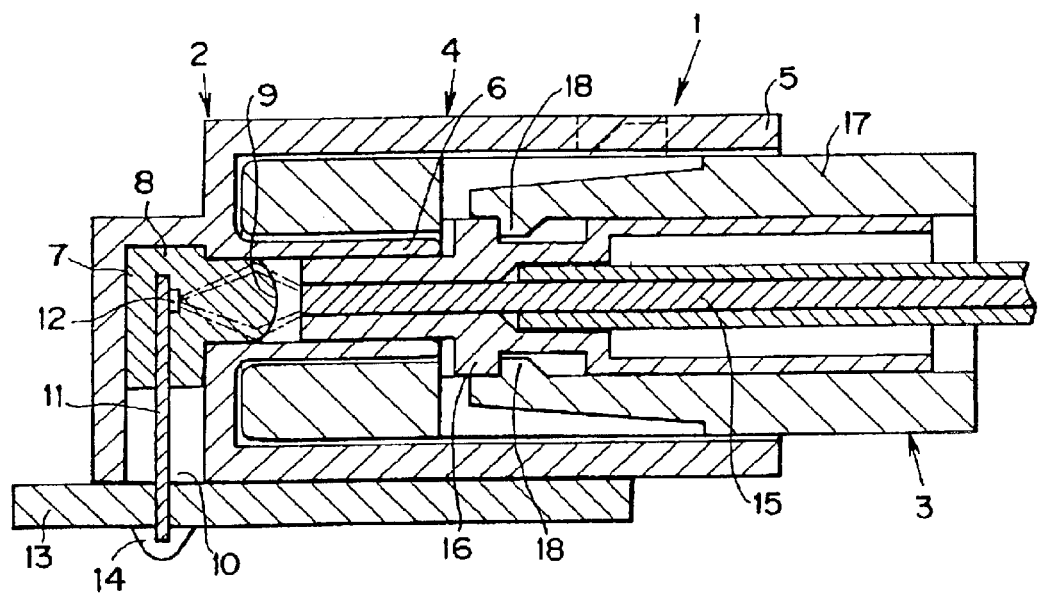
FIG. 1 is a longitudinal section showing a specific embodiment of the invention.

Here will be described a specific embodiment of the invention with reference to the accompanying drawings. In FIG. 1, an optical connector 1 is constructed to include an optical transceiver (a receiver unit) 2 and a plug connector (or a plug unit) 3, which are connected with each other.

The optical transceiver 2 is provided with a receptacle housing 4 as a housing member. The receptacle housing 4 is made by integrating a bottomed outer cylinder portion 5 having a rectangular opening shape and a smaller cylinder portion 6 protruding from the central portion of the bottom portion (i.e., the lefthand wall portion of FIG. 1) of the outer cylinder portion 5. The smaller cylinder portion 6 is opened through the bottom portion of the outer cylinder portion 5. On the outer face side of the bottom portion of the outer cylinder portion 5, moreover, there is integrally formed a hollow element fixing portion 7 which has a rectangular section. The smaller cylinder portion 6 is opened toward the inside of the element fixing portion 7. This element fixing portion 7 is opened on one outer surface side of the outer cylinder portion 5.

Into the element fixing portion 7, there is inserted from the opening 10 thereof a lead frame 11 which is provided with a light receiving/emitting element 12 at its leading end portion. Moreover, this leading end portion of the lead frame 11 including the light receiving/emitting element 12 is fixed by a transparent resin 8 filling thereon. In this state, moreover, the optical axis of the light receiving/emitting element 12 is aligned with with the center axis of the smaller cylinder portion 6.

The transparent resin 8 extends into the smaller cylinder portion 6 and is so curved at its end face portion in the smaller cylinder portion 6 as to form a lens 9 for condensing an optical signal to come into or go out of the light receiving/emitting element 12. Therefore, the lens 9 thus formed is held in the smaller cylinder portion 6 and at a position retracted inward (or leftward of FIG. 1) from the end face of the optical transceiver 2. This is because the surface of the lens 9 is positioned in the smaller cylinder portion 6 so that it may be prevented, when handled, from being contaminated or damaged.

With the optical transceiver 2 being mounted on a circuit substrate 13, still moreover, the lead frame 11 penetrates through the circuit substrate 13 and is fixed, while being connected with the circuit, by a solder 14.

The plug connector 3 is constructed to include: an optical fiber 15 extended from a control panel or the like; a ferrule portion 16 fitted on the leading end portion of the optical fiber 15; and a plug housing 17 housing the ferrule portion 16. This ferrule portion 16 holds the optical fiber 15 inserted therein on its center axis such that its leading end face is flush with that of the optical fiber 15.

At positions retracted a predetermined distance from the leading end portion of the plug housing 17, on the other hand, there are formed a pair of upper and lower cantilever lock members 18 which are bent elastically in the vertical directions of the Drawing. The ferrule portion 16 is clamped at the leading end portions of the lock members 18 so that it is fixed and held in the plug housing 17. In this state, the leading end face of the ferrule portion 16, i.e., the exposed leading end face of the optical fiber 15 is so housed in the plug housing 17 as is retracted the predetermined distance from the leading end portion of the plug housing 17.

In the portion from the leading end portion of the plug housing 17 to the vicinity of the leading end portions of the lock members 18, moreover, there is formed a through hole for fitting the smaller cylinder portion 6 integrated with the receptacle housing 4 when the plug housing 17 is inserted and fitted in the receptacle housing 4. In this through hole, therefore, there is positioned the leading end portion (i.e., the leading end portion of the optical fiber 15) of the ferrule portion 16 holding the paired lock members 18.

In the aforementioned state in which the optical transceiver 2 and the plug connector 3 are connected, the ferrule portion 16 and the lens 9 confront each other while leaving a space inbetween. The ferrule portion 16 is fitted in the smaller cylinder portion 6 and fixed at a predetermined position where the inner optical fiber 15 and the lens 9 are focused.

Figure 4:
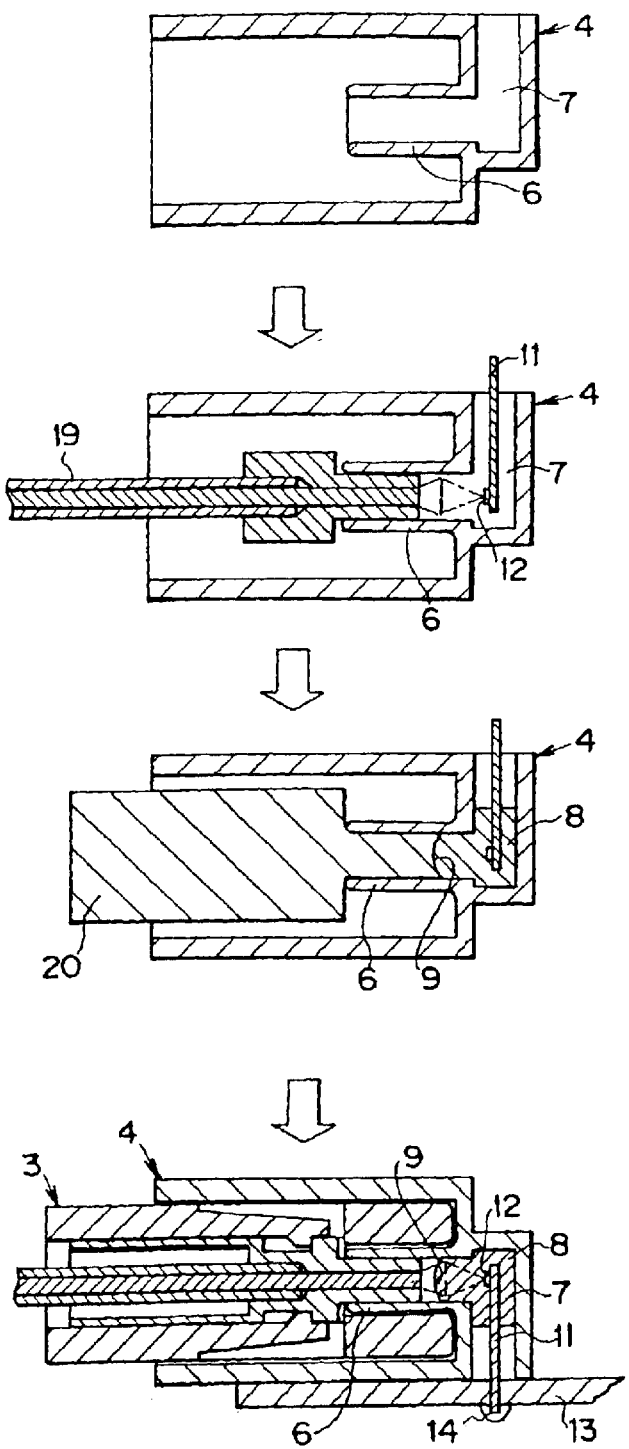
FIG. 4 presents diagrams showing a process for fixing a light receiving/emitting element shown in FIG. 1.

FIG. 4 shows a process for shaping the lens 9 of FIG. 1. First of all, the receptacle housing 4 is arranged with the opening 10 being directed upward. Then, a dummy fiber 19 is fitted in the smaller cylinder portion 6. Moreover, the lead frame 11 having the light receiving/emitting element 12 fixed at its leading end portion is inserted downward from the opening 10. Here, the other side of the lead frame 11 opposed to the light receiving/emitting element 12 is fixed by the chuck or the like of a not-shown centering device.

In this state, the light receiving/emitting element 12 is adjusted and positioned by moving it in the three orthogonal axial directions, i.e., longitudinally, transversely and vertically while measuring the power of light emitted and received from the dummy fiber 19.

After the position of the light receiving/emitting element 12 was determined, the dummy fiber 19 is removed from the smaller cylinder portion 6. Then, this smaller cylinder portion 6 and the element fixing portion 7 are filled with the transparent resin 8 to package the light receiving/emitting element 12. After this, a molding core pin 20 is inserted into the outer cylinder portion 5 so that the transparent resin 8 in the smaller cylinder portion 6 is shaped into a convex shape to form the lens 9. Here, this lens 9 is formed and positioned at the focal point of the light receiving/emitting element 12.

When an optical signal is transmitted in the aforementioned construction from the side of the plug connector 3, it is emanated in the connected optical connector 1 from the leading end of the optical fiber 15 to the lens 9 formed of the transparent resin 8. The optical signal emanated advances through the clearance between the optical fiber 15 and the lens 9 so that it is condensed by the lens 9. The optical signal thus condensed advances in the transparent resin 8 to the light receiving/emitting element 12. The optical signal thus transmitted to the light receiving/emitting clement 12 is then transmitted to electronic parts or the like.

According to the specific embodiment thus far described, therefore, the optical signal transmitted by the optical fiber 15 can be condensed by providing the lens 9 formed of the transparent resin 8. Even with the space between the optical fiber 15 and the light receiving/emitting element 12, therefore, the optical signal can be transmitted without fail. Thus, the transmission loss of the optical signal can be reduced to eliminate the optical conduction member which has been provided as the transmission medium of the optical signal in the prior art. Moreover, it is possible to reduce the connection loss of the optical connector 1.

Moreover, the lens 9 is formed of the transparent resin 8 so that the number of parts can be reduced. Therefore, the number of members for mediating the transmission of the optical signal can be reduced to lower the transmission loss. Moreover, the space from the lens 9 to the light receiving/emitting element 12 is filled up with the transparent resin 8 so that the optical signal incident on the lens 9 can be efficiently transmitted to the light receiving/emitting element 12.

Moreover, the light receiving/emitting element 12 is fixed at a predetermined position by the transparent resin 8, and the ferrule portion 16 is fixed by the lock members 18 of the plug housing 17. By inserting the plug connector 3 into the receptacle housing 4 of the optical transceiver 2, therefore, the relative positions between the optical fiber 15 and the light receiving/emitting element 12 are determined highly precisely. Thus, the assembly can be simplified to lower the manufacture cost.

Figure 3:
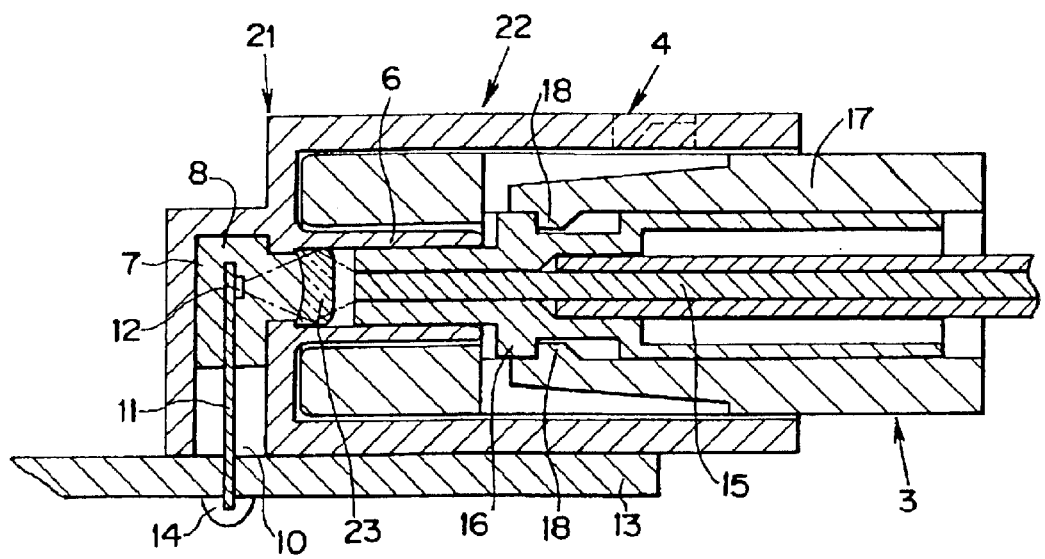
FIG. 3 is a longitudinal section showing another specific embodiment of the invention.

Here will be described another specific embodiment. Here, the members identical to those of the foregoing specific embodiment will be omitted on their description by designating them by the common reference numerals in FIGS. 3 and 4. In FIG. 3, an optical connector 22 is constructed of an optical transceiver 21 and the plug connector 3, which are connected to each other by fitting them.

The optical transceiver 21 is provided the receptacle housing 4 as the housing. In the vicinity of the end portion of the element fixing portion 7 in the inserting direction of the plug connector 3, there is disposed a lens 23 which is formed of a transparent material such as plastics. The clearance between the lens 23 and the light receiving/emitting element 12 is filled up with the transparent resin 8.

In the aforementioned state in which the optical transceiver 21 and the plug connector 3 are connected, the ferrule portion 16 and the lens 23 confront each other while leaving a space inbetween. The ferrule portion 16 is fitted in the smaller cylinder portion 6 and is fixed at a predetermined position to focus the inner optical fiber 15 and the lens 23.

Figure 2:
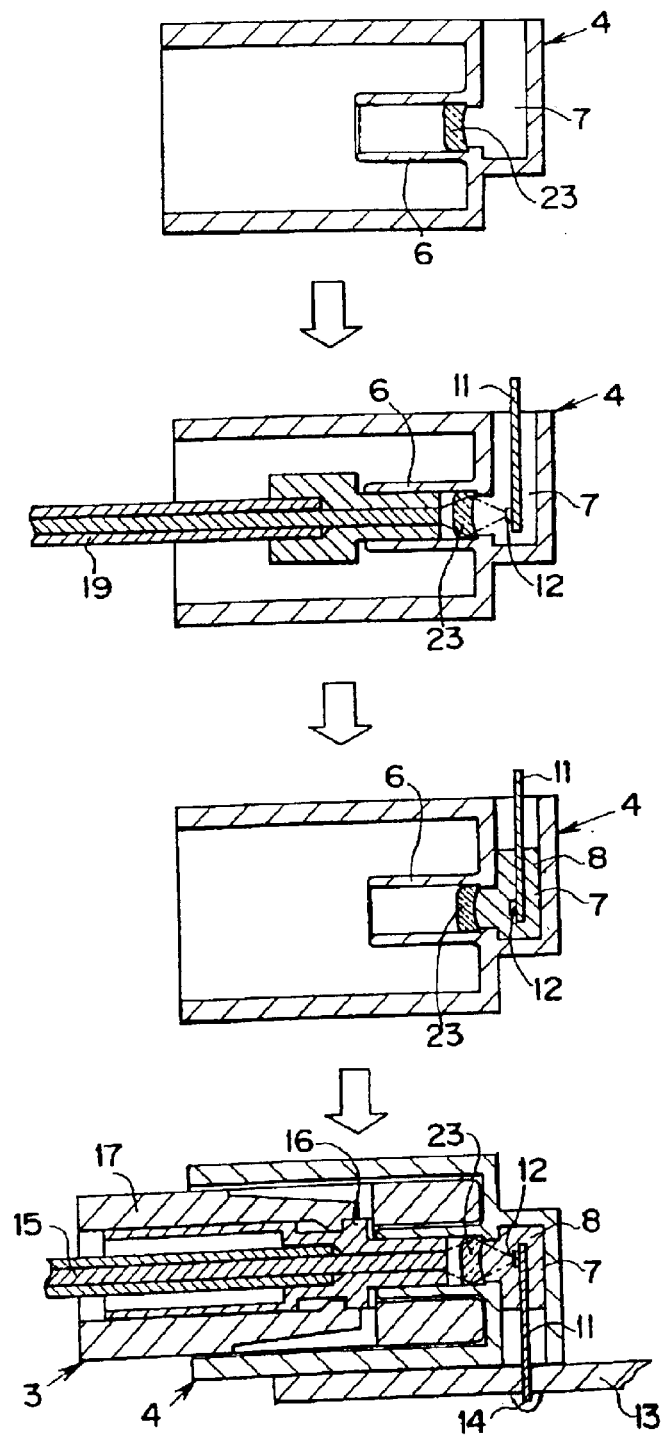
FIG. 2 presents diagrams showing a process for shaping a lens shown in FIG. 3.

FIG. 2 shows a process for fixing the light receiving/emitting element 12 at a predetermined position of the receptacle housing 4 in the construction shown in FIG. 3. First of all, the receptacle housing 4 having the lens 23 fitted at the predetermined position of the smaller cylinder portion 6 is arranged with the opening 10 being directed upward. Then, the dummy fiber 19 is fitted in the smaller cylinder portion 6. Moreover, the lead frame 11 having the light receiving/emitting element 12 fixed at its leading end portion is inserted downward from the opening 10. Here, the other side of the lead frame 11 opposed to the light receiving/emitting clement 12 is fixed by the chuck or the like of the not-shown centering device.

In this state, the light receiving/emitting element 12 is adjusted and positioned by moving it in the three axial directions while measuring the power of light emitted and received from the dummy fiber 19.

After the position of the light receiving/emitting element 12 was determined, the dummy fiber 19 is removed from the smaller cylinder portion 6. Then, this smaller cylinder portion 6 and the element fixing portion 7 are filled with the transparent resin 8 to package the light receiving/emitting element 12.

Through the process thus far described, the light receiving/emitting clement 12 is fixed with the transparent resin 8 at the predetermined position of the receptacle housing 4, and the clearance between the lens 23 and the light receiving/emitting element 12 is filled with the transparent resin 8.

When an optical signal is transmitted in the aforementioned embodiment from the side of the plug connector 3, it is emanated in the connected optical connector 22 from the leading end of the optical fiber 15 to the lens 23. The optical signal emanated advances through the clearance between the optical fiber 15 and the lens 23 so that it is condensed by the lens 23. The optical signal thus condensed is emanated into the transparent resin 8 contacted by the lens 23, and advances in the transparent resin 8 to the light receiving/emitting element 12. The optical signal thus transmitted to the light receiving/emitting element 12 is then transmitted to electronic parts or the like.

According to the specific embodiment thus far described, therefore, the optical signal transmitted by the optical fiber 15 can be condensed by interposing the lens 23 between the optical fiber 15 and the light receiving/emitting element 12. Even with the space between the optical fiber 15 and the light receiving/emitting element 12, therefore, the optical signal can be transmitted without fail. Thus, the transmission loss of the optical signal can be reduced to eliminate the optical conduction member which has been provided as the transmission medium of the optical signal in the prior art. Moreover, it is possible to reduce the connection loss of the optical connector 22.

Moreover, the clearance between the lens 23 and the light receiving/emitting element 12 is filled with the transparent resin 8 so that the light receiving/emitting element 12 can be stably fixed at the predetermined position.

Moreover, the light receiving/emitting element 12 is fixed at a predetermined position by the transparent resin 8, and the ferrule portion 16 is fixed by the lock members 18 of the plug housing 17. By inserting the plug connector 3 into the receptacle housing 4 of the optical transceiver 2, therefore, the relative positions between the optical fiber 15 and the light receiving/emitting element 12 are determined highly precisely. Thus, the assembly can be simplified to lower the manufacture cost.

Here will be synthetically described the advantages which can be obtained by the invention. According to the invention, as has been described hereinbefore, the lens is interposed between the optical fiber and the light receiving/emitting element so that the optical signal can be transmitted without fail. It is, therefore, possible to eliminate the optical conduction member which has been provided as the transmission medium of the optical signal in the prior art. It is also possible to reduce the connection loss by the optical connector.

According to the invention, on the other hand, the lens is arranged deep in the cylindrical portion, into which the end portion of the optical fiber of the receiving portion is inserted, so that the optical axes of the optical fiber, the lens and the light receiving/emitting element are fixedly aligned. As a result, the element fixing portion need not be accurately formed for adjusting the optical axes so that the manufacture cost can be lowered.

According to the invention, on the other hand, the clearance between the lens and the light receiving/emitting element is filled with the transparent resin so that the light receiving/emitting element can be stably fixed at the predetermined position.

According to the invention, on the other hand, the lens is formed of the transparent resin packaging the light receiving/emitting element so that the number of parts can be reduced to lower the manufacture cost.

What is claimed is:

1. An optical connector including a plug unit having a plug portion configured to hold an end face of an optical fiber and a receptacle unit having packaged therein a light receiving/emitting element to transfer an optical signal between the end face of said optical fiber and said light receiving/emitting element when the plug unit and the receptacle unit are connected together, wherein, said receptacle unit includes a hollow portion configured to permit insertion of the plug portion holding the end face of said optical fiber therein when the plug unit and the receptacle unit are connected together, a lens disposed inside of the hollow portion at a position separated from the light receiving/emitting element and the plug portion holding the end face of said optical fiber when the plug unit and the receptacle unit are coupled together, and a transparent resin body configured to surround the light receiving/emitting element and including a transparent resin body portion extending into an adjacent cart of the hollow portion to completely fill the adjacent part of the hollow portion.

2. An optical connector according to claim 1, wherein said lens is disposed deep in said hollow portion.

3. An optical connector according to claim 2, wherein the transparent resin also fills all of the space in the hollow portion between said lens and said light receiving/emitting element.

4. An optical connector according to claim 1, wherein said transparent resin body portion is configured to have a spherical face to form said lens.

5. A method for manufacturing a receptacle unit configured to house a light receiving/emitting element so that an exposed leading end portion of an optical fiber housed in a plug unit and the light receiving/emitting element will be positioned in a confronting manner when the receptacle unit and the plug unit are connected to form an optical connector by inserting a portion of the plug unit holding the optical fiber exposed leading end portion into a hollow portion of the receptacle unit, comprising:

the step of inserting said light receiving/emitting element in an element fixing portion of said receptacle unit so as to be aligned with an opening in the element fixing portion forming an entry into the hollow portion;

the step of orienting said light receiving/emitting element in said receptacle unit using a dummy optical fiber inserted into the hollow portion;

the step of adding a transparent resin around said light receiving/emitting element to fix the light receiving/emitting element in place with an orientation determined by the step of orienting and into a part of the cylindrical portion; and the step of fanning a lens from said transparent resin in the part of the hollow portion by using a mold introduced into the cylindrical portion.

6. A method for manufacturing a receptacle unit configured to house a light receiving/emitting element so that an exposed leading end portion of an optical fiber housed in a plug unit and the light receiving/emitting element will be positioned in a confronting manner when the receptacle unit and the plug unit are connected to form an optical connector by inserting a portion of the plug unit holding the optical fiber exposed leading end portion into a hollow portion of the receptacle unit comprising:

the step of inserting said light receiving/emitting element in an element fixing portion of said receptacle unit so as to be aligned with an opening in the element fixing portion forming an entry into the hollow portion;

the step of inserting a lens in a predetermined position in the hollow portion of said receptacle unit;

the step of orienting said light receiving/emitting element in said element fixing portion of receptacle unit using a dummy optical fiber inserted into the hollow portion; and the step of adding a transparent resin between said light receiving/emitting element and said lens to fill any space between the light receiving/emitting element and the lens and around said light receiving/emitting element to fix the light receiving/emitting element in place with an orientation determined by the step of orienting.

* * * * *

UNITED STATES PATENT AND TRADEMARK OFFICE
CERTIFICATE OF CORRECTION

PATENT NO. : 6,817,781 B2
DATED : November 16, 2004
INVENTOR(S) : Takehisa Ide

It is certified that error appears in the above-identified patent and that said Letters Patent is hereby corrected as shown below:

<u>Column 7,</u>
Line 35, please change "cart" to -- part --.

Signed and Sealed this

Twenty-second Day of February, 2005

JON W. DUDAS
*Director of the United States Patent and Trademark Office*